United States Patent [19]

Shinoda et al.

[11] 4,008,779
[45] Feb. 22, 1977

[54] POWER STEERING CONTROL SYSTEM FOR INDUSTRIAL TRUCKS

[75] Inventors: Akibumi Shinoda, Handa; Hiroyuki Yoshino, Ohbu, both of Japan

[73] Assignee: Kabushiki Kaisha Toyoda Jidoshokki Seisakusho, Kariya, Japan

[22] Filed: Dec. 8, 1975

[21] Appl. No.: 638,402

[30] Foreign Application Priority Data

Dec. 24, 1974 Japan .................................. 49-1576

[52] U.S. Cl. ........................... 180/79.1; 318/139
[51] Int. Cl.$^2$ .................................................. B62D 5/04
[58] Field of Search ............ 180/79.1; 60/433, 434, 60/423, 415, 403; 318/139

[56] References Cited

UNITED STATES PATENTS 3,134,063  5/1964  Hastings .......................... 318/139
3,884,318  5/1975  Abels et al. ...................... 180/65 R

*Primary Examiner*—Joseph F. Peters
*Assistant Examiner*—R. Schrecengost
*Attorney, Agent, or Firm*—Sughrue, Rothwell, Mion, Zinn & Macpeak

[57] ABSTRACT

A power steering control system for an industrial truck, in which there is provided an improved switching circuit for the electric steering motor. The switching circuit is so operable by the accelerator pedal of the industrial truck that when the pedal is depressed the motor starts instantly, but when the pedal is released the motor stops a slight time after.

3 Claims, 1 Drawing Figure

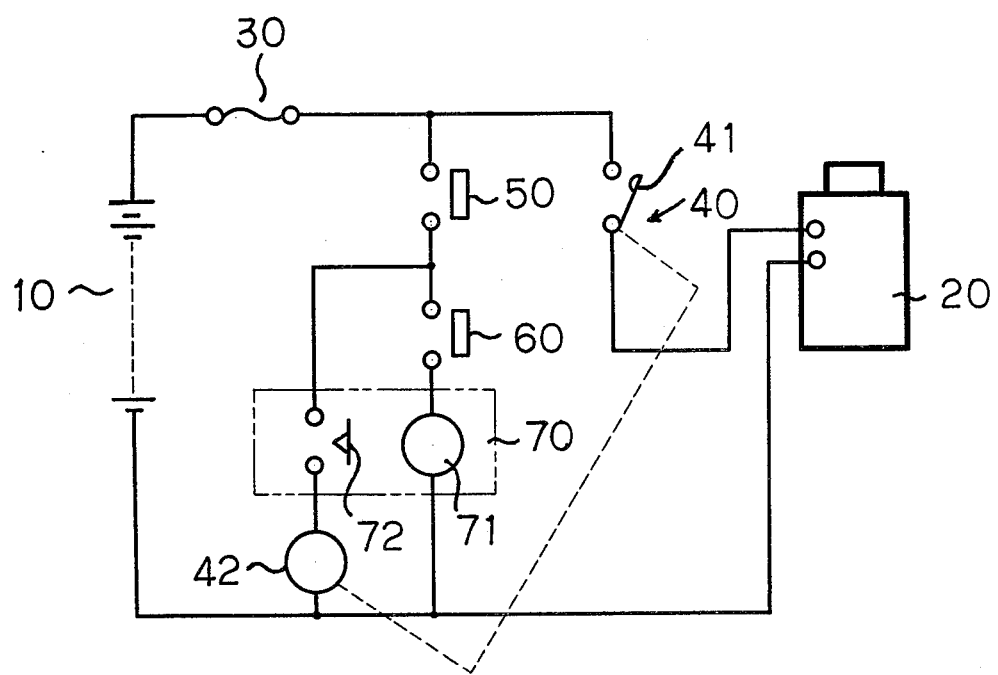

POWER STEERING CONTROL SYSTEM FOR INDUSTRIAL TRUCKS

BACKGROUND OF THE INVENTION

The present invention relates to a power steering control system for an industrial truck, more particularly, to an switching circuit for the electric steering motor of the system, which is operated by the accelerator pedal of the truck.

Generally the electric power steering motor is connected to the key switch, and all the time when the key switch is in the condition of ON, the motor continues to drive the hydraulic pump in the power steering system.

In the industrial truck, for example a fork lift truck, the driver often operates the loading mechanism equipped with the truck for a respectable part of the whole operating time. At the time of the loading operation the driver handles some control levers of change over valves, which are hydraulically connecting the cylinders of the loading mechanism and the pump driven by the exclusive electric motor for the hydraulic loading system, but does not operates the steering handle or the accelerator pedal of truck, as the driver is not in need of changing its position.

Therefore the steering motor and the steering pump need not be rotated during the loading operation to save the electric energy of the storage battery and to decrease the noise.

OBJECT OF THE INVENTION

It is an object of the present invention to provide an improved power steering control system for industrial trucks being able to save the electric energy and to decrease the noise.

Another object is the provision of an improved switching circuit for a power steering motor of an industrial truck.

SUMMARY OF THE INVENTION

These objects are attained in the present invention wherein the switching circuit for the electric steering motor includes a normally opened switch, which is closed by the depression of the accelerator pedal of the truck.

The switching circuit is also provided with time delaying means which are helpful to steer the truck after the accelerator pedal is released when running by inertia or running down a slope.

BRIEF DESCRIPTION OF THE DRAWING

The sole FIGURE represents schematically an industrial truck electric circuit for controlling the steering motor operation.

DETAILED DESCRIPTION OF THE INVENTION

Referring now in detail to the drawing, the storage battery for the truck is indicated by numeral 10, which is connected with the electric steering motor 20, and the motor 20 is mechanically joined to the hydraulic pump (not shown) of a power steering system. Between the storage battery 10 and the steering motor 20 there is inserted a fuse 30 in series with the contacts 41 of a relay 40, the latter being shunted by the key switch 50 in series with a switch 60 and the coil 71 of an "off-delay" timer 70.

In parallel with the switch 60 and the coil 71 there are connected the contacts 72 of the "off-delay" timer 70 in series with the coil 42 of the relay 40. The switches 50, 60 and the contacts 41, 72 are normally opened, and the switch 60 is turned "on" by a slight depression of the accelerator pedal (not shown) of the truck. As the hydraulic loading system, the pump and drive means thereof are conventional, a detailed description is not deemed necessary.

When the driver turns the key switch 50 "on" and then depresses the accelerator pedal, the switch 60 is also turned "on" thereby closing the circuit through the coil 71, instantly followed by moving the contacts 72 to closed position and closing the circuit through the coil 42, whereby the contacts 41 of the relay 40 close the circuit between the storage battery 1 and steering motor 2, bringing the power steering system into operation. If the driver releases the accelerator pedal, as during the lifting and lowering of the load, running by inertia before or during applying the brake of the truck or running down a slope, the switch 60 will be turned "off" thereby opening the circuit through the coil 71. After a delay, the contacts 72 and the contact 41 of relay 40 will open, so that the circuit between the storage battery 1 and steering motor 2 will be broken, and the steering motor 2 and the steering pump (not shown) will be stopped.

The "off-delay" timer 70, such as OMRON ATS-10 or RDA operates such that when the coil 71 is energized, the contacts 72 close instantly, but when the coil 71 is de-energized, the contacts 72 open after the set interval of time. This characteristic is favorable to steer the truck in the condition of running by inertia or running down a slope, because in these cases the driver is able to utilize the power steering only by a slight tapping on the accelerator pedal. Also since the "off-delay" timer 70 prevents the switching operation from over-sensitiveness, even if the driver is joggled on the rough road and the switch 60 repeats "on"-"off" in a short time, the relay 40 keeps switch 41 closed, whereby the power steering performance is not varied. The delayed time of the timer 70 may be set according to the type of the industrial truck and the sort of the work, but generally it is suitable to set the timer for delaying several seconds.

Although we have described and illustrated a preferred embodiment of our invention, it will be understood by those skilled in the art that modifications may be made in the structure, form and relative arrangement of parts without necessarily departing from the spirit and scope of the invention. Accordingly, it should be understood that we intended to cover by the appended claims all such modifications which fall within the scope of my invention.

We claim:

1. An electrically operated power steering control system for an industrial truck comprising an accelerator pedal, battery means, electric motor means for operating said power steering control system, circuit means interconnecting said battery means and said electric motor means, switch means in said circuit operable in response to the depression of said accelerator pedal for closing said circuit means to operate said electric motor means and time delay means to delay the opening of said circuit means after the release of said accelerator pedal.

2. An electrically operated power steering control system as set forth in claim 1 wherein said switch means includes a first switch directly connected in series with said battery means and said electric motor means, a second switch directly operable by said accelerator pedal and time-delay relay means connected in series with each other across said first switch and said electric motor means whereby upon closure of said second switch said time-delay relay means will be energized immediately to close said first switch and energize said electric motor means and upon opening said second switch said time-delay relay means will cause said first switch to open after a predetermined time delay.

3. An electrically operated power steering control system as set forth in claim 2 wherein said time-delay relay means is comprised of a first relay having delayed-release coil means and a pair of contacts in parallel with said second switch and said delayed release coil means and a second relay having an operating coil in series with said pair of contacts and operatively connected to said first switch.

* * * * *